United States Patent [19]

Bhang

[11] Patent Number: 5,264,923
[45] Date of Patent: Nov. 23, 1993

[54] SYSTEM FOR SEPARATING LUMINANCE AND CHROMINANCE SIGNALS FROM A COMPOSITE VIDEO SIGNAL

[75] Inventor: Joon W. Bhang, Seoul, Rep. of Korea

[73] Assignee: Gold Star Co., Ltd., Seoul, Rep. of Korea

[21] Appl. No.: 917,718

[22] Filed: Jul. 24, 1992

[30] Foreign Application Priority Data

Jul. 26, 1991 [KR] Rep. of Korea ............... 12913/1991

[51] Int. Cl.$^5$ .............................................. H04N 9/78
[52] U.S. Cl. ......................................... 358/31; 358/36; 358/105
[58] Field of Search ................... 358/31, 21 R, 37, 39, 358/40, 105, 36, 166, 167

[56] References Cited

U.S. PATENT DOCUMENTS

| | | | |
|---|---|---|---|
| 4,617,589 | 10/1986 | Weckenbrock | 358/31 |
| 4,994,906 | 2/1991 | Moriwake | 358/31 |
| 5,047,866 | 9/1991 | Watanabe | 358/36 |
| 5,155,582 | 10/1992 | Tokoi | 358/31 |

OTHER PUBLICATIONS

IDTV Receiver, Kiyouki Kawai et al, IEEE Transactions on Consumer Electronics, vol. CE-33, No. 3, Aug. 1987, pp. 181-191.

Primary Examiner—James J. Groody
Assistant Examiner—Sherrie Hsia
Attorney, Agent, or Firm—Finnegan, Henderson, Farabow, Garrett & Dunner

[57] ABSTRACT

A system for separating luminance and chrominance signals from a composite video signal, comprising frame and line comb filters for outputting frame and line difference signals of the video signal respectively, a first filter for extracting a chrominance signal from the video signal, a line correlation detector for detecting the line correlations based on the line difference signals, a chrominance signal level detector for detecting a level of the output of the first filter, a switch for selecting one of the outputs of the line comb filter and first filter, a moving level detector for detecting a moving level of the video signal based on the frame difference signal, a moving signal generator for generating a moving factor, a first operator for operating the output of the switch and the moving factor, a second operator for operating the output of the frame comb filter and a value (reference value minus moving factor), an adder for adding the outputs of the first and second operators, a second filter for filtering the output of the adder to extract a chrominance signal, a third filter for filtering the output of the adder to output the final chrominance signal, a delay element for delaying the video signal, and a subtracter for subtracting the second filter output from the delay element output to output the final luminance signal.

22 Claims, 11 Drawing Sheets

F I G. 13
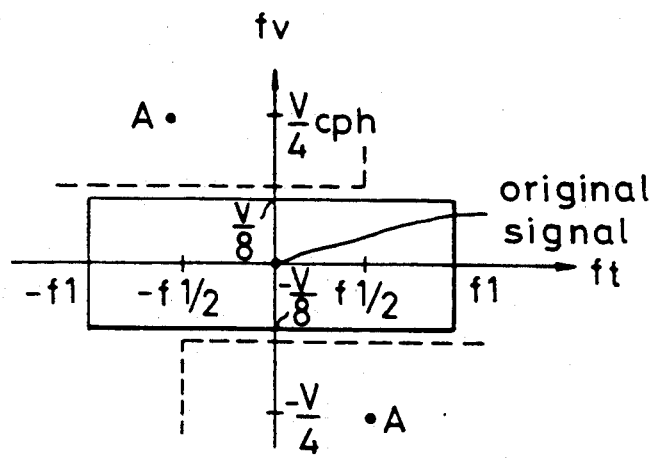
F I G. 14
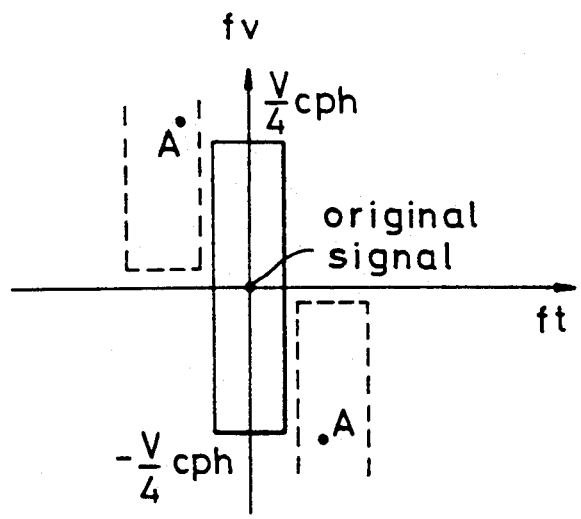

SYSTEM FOR SEPARATING LUMINANCE AND CHROMINANCE SIGNALS FROM A COMPOSITE VIDEO SIGNAL

BACKGROUND OF THE INVENTION

1. Field of the Invention

The present invention relates in general to a system for separating luminance and chrominance signals from a composite video signal in a television broadcasting system, such as a NTSC system, a PAL system or a SECAM system, and more particularly to an improved system for separating luminance and chrominance signals from a composite video signal, which is suitable to obtain a better quality of picture in high vision systems of high resolution, such as a high definition television set (HDTV), an enhanced definition television set (EDTV) and a high definition video cassette recorder (HDVCR).

2. Description of the Prior Art

FIG. 1 is a block diagram of a conventional system for separating luminance and chrominance signals from a composite video signal utilizing both frame and line comb filters and FIG. 2 is a block diagram of another conventional system for separating luminance and chrominance signals from a composite video signal utilizing only a line comb filter and having a construction different from the system in FIG. 1. Herein, a frame represents one picture of a television broadcasting signal. In a television broadcasting system such as, for example, a NTSC system, each of frames, or pictures consists of 525 lines, which is sent every 1/30 sec from a broadcasting station. In each of the frames, odd and even lines, respectively of 252.5 lines are in turn sent every 1/60 sec from the broadcasting station in a standard interlaced scanning manner. From this fact, it can be seen that each of the frames consists of the two fields. In the NTSC system, each of the lines is provided in the unit of 15.75 KHz (64.5 μsec). Each of frame signals to be used below indicates a video signal which is delayed by 525 lines as mentioned above, i.e., a video signal next to two fields or 1/30 sec and a frame difference signal is obtained by subtracting a frame signal prior to one frame from the current frame signal or subtracting the current frame signal from a frame signal next to one frame. This frame difference signal is comprised of only a chrominance signal component due to removal of a luminance signal component in the composite video signal, as will be described later.

The basic principles of the comb filters used in the systems of FIGS. 1 and 2 will now be described with reference to FIGS. 3A and 3B.

FIG. 3A illustrates a one-dimensional frequency spectrum showing an arrangement of the luminance and chrominance signals every line in the television broadcasting signal in the NTSC system and FIG. 3B illustrates a one-dimensional frequency spectrum showing an arrangement of the luminance and chrominance signals every frame in the television broadcasting signal in the NTSC system. The television broadcasting signal in the NTSC system is in the mixed form of the chrominance and luminance signals which are superposed on each other on the frequency spectra as shown in FIGS. 3A and 3B. The comb filter is provided to separate the chrominance and luminance signals from the composite video signal. In the television broadcasting signal in the NTSC system, the chrominance signal is 180° out of phase every line and, also, every frame (every 525 lines). As a result, since two successive lines of the chrominance signal are oppositely phased with each other, a comb filtered luminance signal output is provided by combining two successive lines of the composite video signal together additively, resulting in cancellation of the chrominance signal. On the contrary, since lines of the luminance signal are originally in phase, a comb filtered chrominance signal output is provided by combining two successive lines of the composite video signal together subtractively, resulting in cancellation of the luminance signal. Therefore, the comb filters in the systems of FIGS. 1 and 2 can separate the luminance and chrominance signals from the composite video signal utilizing the above principles.

First, the operation of a construction in FIG. 1 will be described.

Upon input of a composite video signal CV, a frame comb filter 1 separates luminance and chrominance signals from the composite video signal CV in the unit of frame and then applies the separated frame chrominance signal FC to an operator 4. At the same time, the composite video signal CV is also inputted by a line comb filter 2. The line comb filter 2 separates luminance and chrominance signals from the composite video signal CV in the unit of line and then applies the separated line chrominance signal LC to an operator 5.

The frame comb filter 1 also applies a frame difference signal FD to a moving level detector 3 for detection of a moving level of the video signal. The moving level detector 3 takes a moving factor K corresponding to the moving level of the video signal, based on the frame difference signal FD, and then feeds the taken moving factor K to the operators 4 and 5. Herein, the moving factor K may be any value between 0 and 1. Namely, $0 \leq K \leq 1$. In this connection, it is noted that the more the moving factor K is approximate to 1, the more the moving level of the video signal becomes severe.

The operator 4 multiplies the received frame chrominance signal FC by a value $(1-K)$ which is obtained by subtracting the moving factor K from 1 and the operator 5 multiplies the received line chrominance signal LC by the moving factor K. Output signals from the operators 4 and 5 are together added in an adder 6, which then outputs the added chrominance signals to a band pass filter 8.

In the television broadcasting signal in the NTSC system, the chrominance signal is typically placed at a frequency band of ±0.5 MHz around a center frequency of 3.58 MHz, as can be seen on a standard frequency spectrum. In this connection, outputted from the band pass filter 8 is the final chrominance signal C of a predetermined frequency band of about 3 MHz–4.2 MHz. The final chrominance signal C from the band pass filter 8 is applied to a subtracter 9.

The composite video signal CV is also inputted by a delay element 7 in which the composite video signal CV is then delayed by a predetermined period of time for synchronization with the chrominance signal C output from the band pass filter 8.

The subtracter 9 subtracts the chrominance signal C from the predetermined time delayed composite video signal CV and then outputs the resulting luminance signal as the final luminance signal Y.

Then, the operation of a construction in FIG. 2 will be described.

Upon input of a composite video signal CV, a line comb filter 11 separates luminance and chrominance signals from the composite video signal CV in the unit of line and then applies the separated line chrominance signal LC to a band pass filter 12.

The band pass filter 12 functions to extract a desired chrominance signal component from the received line chrominance signal LC. As a result, outputted from the band pass filter 12 is only a desired component of chrominance signal C of a frequency band of ±0.5 MHz around a center frequency fsc.

The line chrominance signal LC from the line comb filter 11 is also inputted by a low pass filter 13 which is provided to remove a chrominance subcarrier from the line chrominance signal LC. For this reason, outputted from the low pass filter 13 is only the residual luminance signal component $\Delta Y$ in which no chrominance signal component is present.

Since the chrominance and luminance signals are overlapped with each other as shown in FIG. 3A, the line comb filter 11 provides the comb filtered or separated line chrominance signal LC in which the residual luminance signal component $\Delta Y$ may be included. Noticeably, the residual luminance signal component $\Delta Y$ is increased more and more for a moving video signal. The residual luminance signal component $\Delta Y$ from the low pass filter 13 is applied to an absolute value generator 14, which then generates an absolute value of the received residual luminance signal component $\Delta Y$. This absolute value is applied to a non-inverting input terminal (+) of a comparator CP1, an inverting input terminal (−) of which is applied with a predetermined threshold value Vth1. The comparator CP1 compares the absolute value at its non-inverting input terminal (+) with the predetermined threshold value Vth1 at its inverting input terminal (−) and outputs the resultant value as a switching control signal to a switch SW1.

The composite video signal CV is also inputted by a delay element 15 in which the composite video signal CV is then delayed by a predetermined period of time for synchronization with the chrominance signal C output from the band pass filter 12. A subtracter 16 subtracts the chrominance signal C from the predetermined time delayed composite video signal CV from the delay element 15 and then feeds the resulting luminance signal to a delay element 17 and a band trap filter 18.

The switch SW1 is connected to the output of the delay element 17 at its one input terminal b and to the output of the band trap filter 18 at its other input terminal b such that it selectively outputs one of the two inputs as the final luminance signal Y, in response to the switching control signal from the comparator CP1. That is, if the switching control signal from the comparator CP1 is high, resulting from the presence of a dot interference, the switch SW1 is activated to select the output of the band trap filter 18. On the contrary, with the switching control signal from the comparator CP1 being low, the switch SW1 is activated to select the output of the delay element 17. The signal selected in the switch SW1 in this manner is outputted as the final luminance signal Y.

The above-mentioned conventional systems for separating the luminance and chrominance signals from the composite video signal utilizing the line and frame comb filters are shown in IDTV Receiver (Kiyoyuki Kawai et al., Toshiba Corporation Consumer Products Engineering Laboratory Yokohama, Japan, IEEE Transactions on consumer Electronics, Vol. CE-33, No. 3, August 1987).

In accordance with the construction in FIG. 2, however, the conventional system utilizing only the line comb filter has a disadvantage, in that cross-talk components may occur because of imperfect separations at vertical boundaries since the current line signal, a signal prior to one line and a signal next to one line which are outputted from the line comb filter are filtered directly by the band pass filter and the low pass filter, respectively. The cross-talk components result in occurrence of a dot interference exerting an adverse effect on the quality of picture.

Also in accordance with the construction in FIG. 1, the conventional system utilizing both the line and frame comb filters has a disadvantage, in that moving of the chrominance signal or the high frequency signal cannot be detected since the moving level detector 3 in the system detects the moving level of the video signal depending on a signal (i.e., the residual luminance signal component) which is obtained by low pass-filtering the frame difference signal FD.

SUMMARY OF THE INVENTION

Therefore, the present invention has been made in view of the above problems, and it is an object of the present invention to provide an improved system for separating luminance and chrominance signals from a composite video signal.

It is another object of the present invention to provide a system for separating luminance and chrominance signals from a composite video signal, which performs the separation of the luminance and chrominance signals from the composite video signal on the basis of a line correlation, utilizing a line difference signal if the line correlation is good, while utilizing a chrominance signal component extracted through general filtering means if the line correlation is bad.

It is still another object of the present invention to provide a system for separating luminance and chrominance signals from a composite video signal, which performs the separation of the luminance and chrominance signals from the composite video signal on the basis of moving of the composite video signal and a line correlation, utilizing combination of a frame difference signal with a chrominance signal component extracted through general filtering means if the line correlation is bad, while utilizing combination of the frame difference signal with a line difference signal if the line correlation is good.

In accordance with the present invention, the above objects can be accomplished by providing a system for separating luminance and chrominance signals from a composite video signal, comprising: frame comb filtering means for detecting a frame difference signal between adjacent frames from the composite video signal and outputting the detected frame difference signal as a frame chrominance signal; line comb filtering means for detecting a plurality of line difference signals from the composite video signal and selectively outputting, as a line chrominance signal, one of the plurality of line difference signals in which a line correlation is good, in response to external control signals; first filtering means for extracting a predetermined frequency band of chrominance signal from the composite video signal; line correlation detecting means for detecting the line correlations based on the plurality of line difference signals from said line comb filtering means and outputting signals corresponding to the detected line correlations as the external control signals to said line comb filtering means; chrominance signal level detecting means for detecting a level of the chrominance signal from said first filtering means; switching means for inputting the line chrominance signal from said line comb filtering means and the chrominance signal from said first filtering means and selectively outputting one of the two input signals in response to output signals from said line correlation detecting means and said chrominance signal level detecting means as switching control signals; moving level detecting means for detecting a moving level of the video signal based on the frame difference signal from said frame comb filtering means; moving signal generating means for generating a moving factor in response to the output signals from said line correlation detecting means and an output signal from said moving level detecting means; first operating means for operating together an output signal from said switching means and the moving factor from said moving signal generating means; second operating means for operating together the frame chrominance signal from said frame comb filtering means and a value which is obtained by subtracting the moving factor from its predetermined reference value; adding means for adding output signals from said first and second operating means together; second filtering means for filtering an output signal from said adding means to extract a predetermined frequency band of chrominance signal; third filtering means for filtering the output signal from said adding means and outputting the filtered signal as the final chrominance signal; delay means for delaying the composite video signal by a predetermined period of time for synchronization with the chrominance signal output from said second filtering means; and subtracting means for subtracting the chrominance signal in said second filtering means from the predetermined time delayed composite video signal in said delay means and outputting the resulting luminance signal as the final luminance signal.

BRIEF DESCRIPTION OF THE DRAWINGS

The above and other objects, features and advantages of the present invention will be more clearly understood from the following detailed description taken in conjunction with the accompanying drawings, in which:

FIG. 13 illustrates a vertical-time, two-dimensional frequency spectrum showing a case where only a luminance signal is band width-compressed after separation of a chrominance signal by the line comb filter in the system of FIG. 4 or 7; and FIG. 14 illustrates a vertical-time, two-dimensional frequency spectrum showing a case where only a luminance signal is band width-compressed after separation of a chrominance signal by a frame comb filter in the system of FIG. 7.

DETAILED DESCRIPTION OF THE PREFERRED EMBODIMENTS

Figure 1:
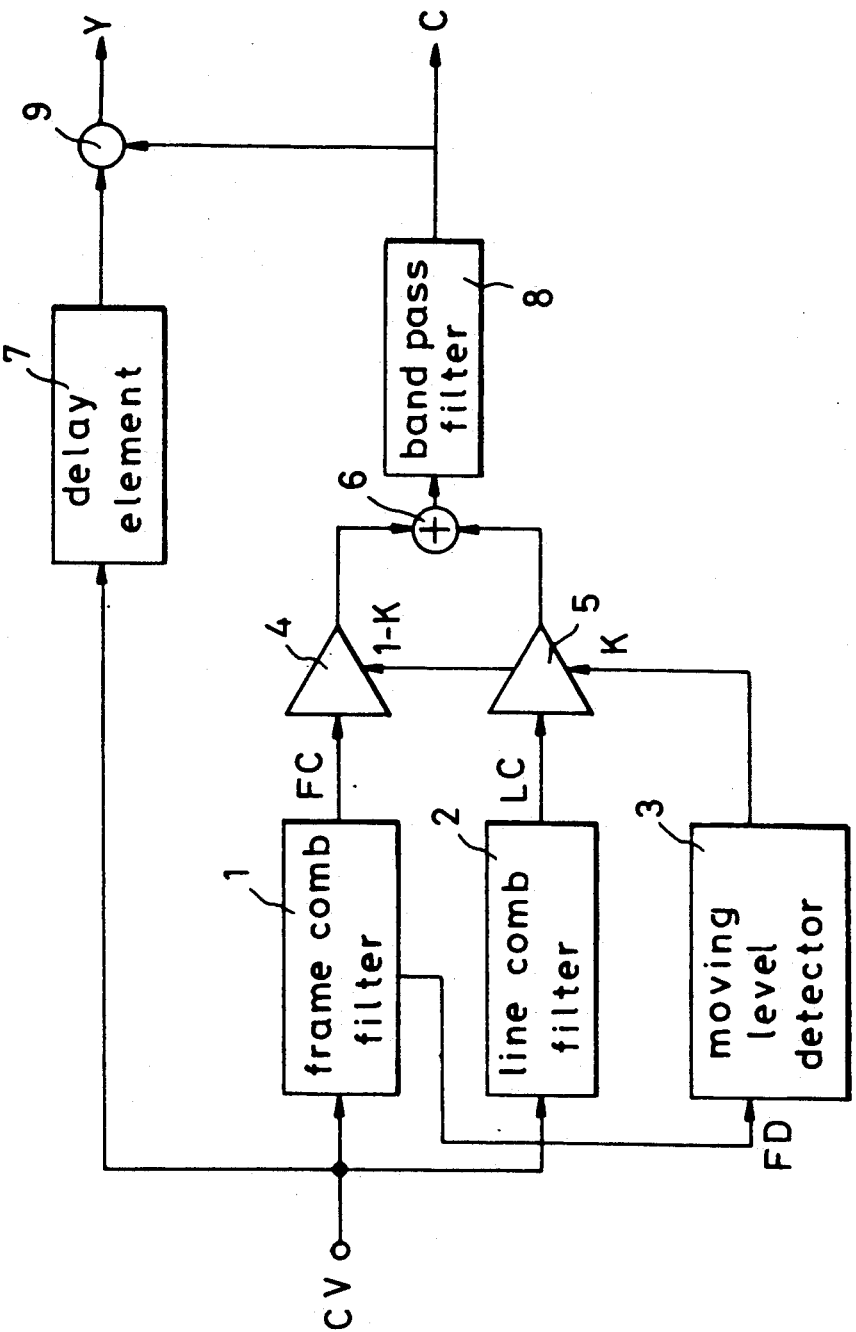
FIG. 1 is a block diagram of a conventional system for separating luminance and chrominance signals from a composite video signal utilizing both frame and line comb filters.
Figure 2:
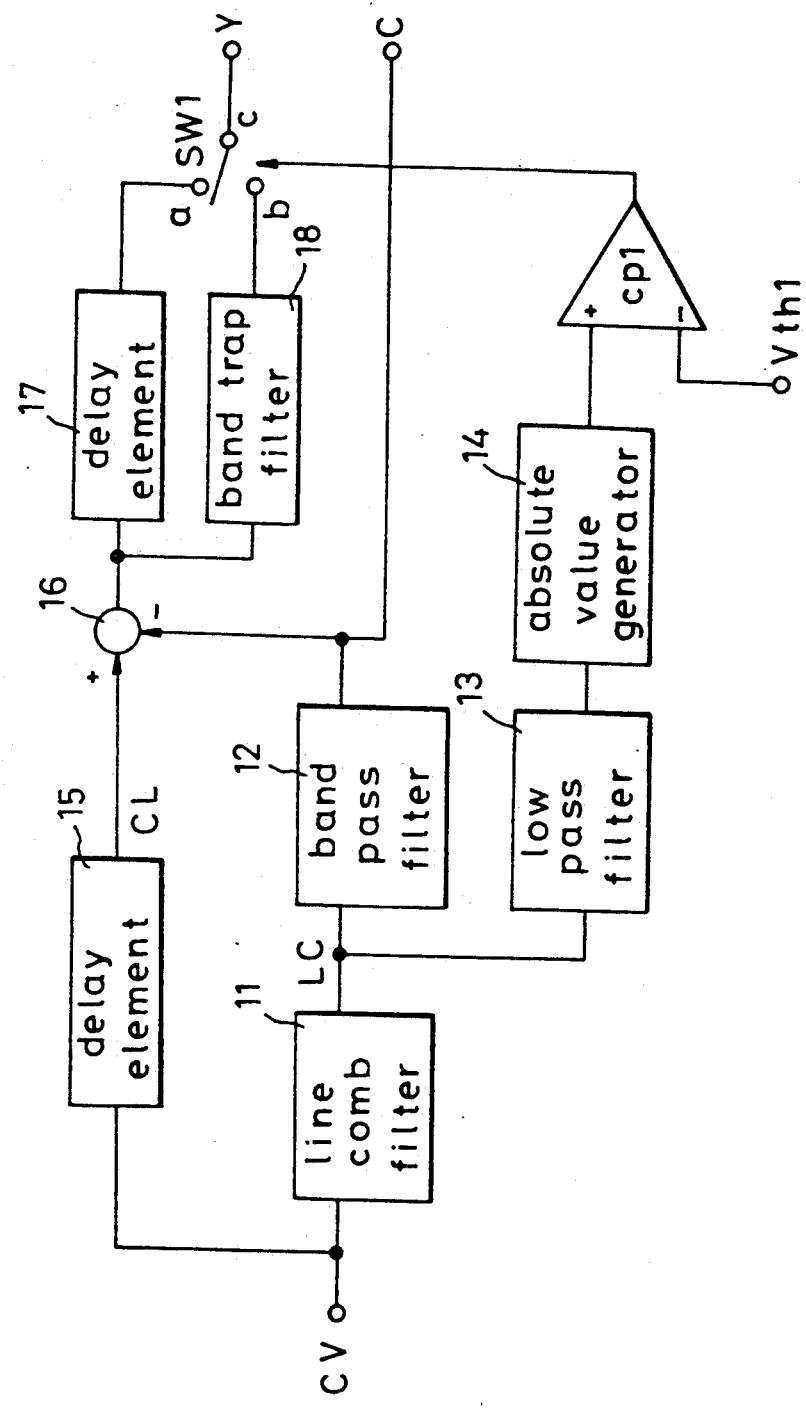
FIG. 2 is a block diagram of another conventional system for separating luminance and chrominance signals from a composite video signal utilizing only a line comb filter.
Figure 3A:
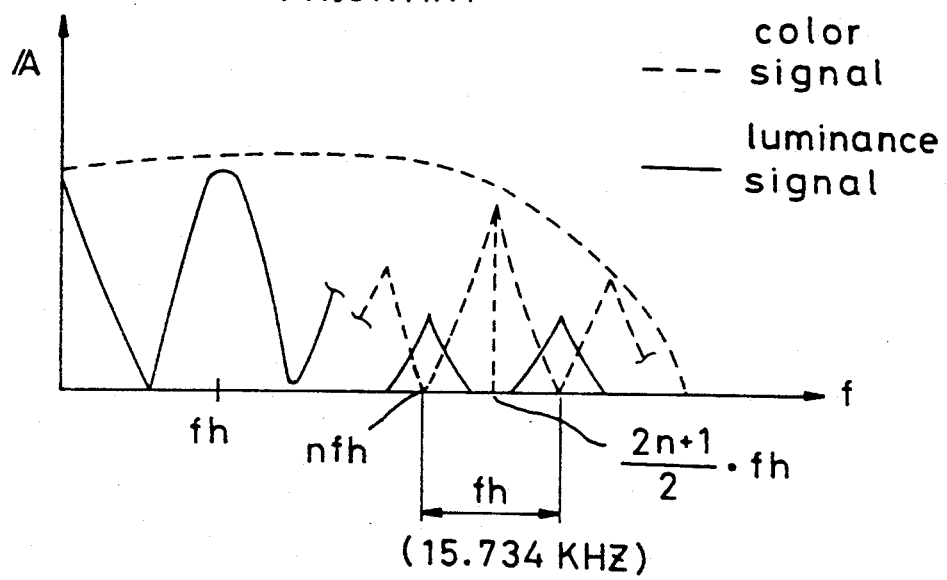
FIG. 3A illustrates a one-dimensional frequency spectrum showing an arrangement of luminance and chrominance signals every line in a television broadcasting signal in a NTSC system.
Figure 3B:
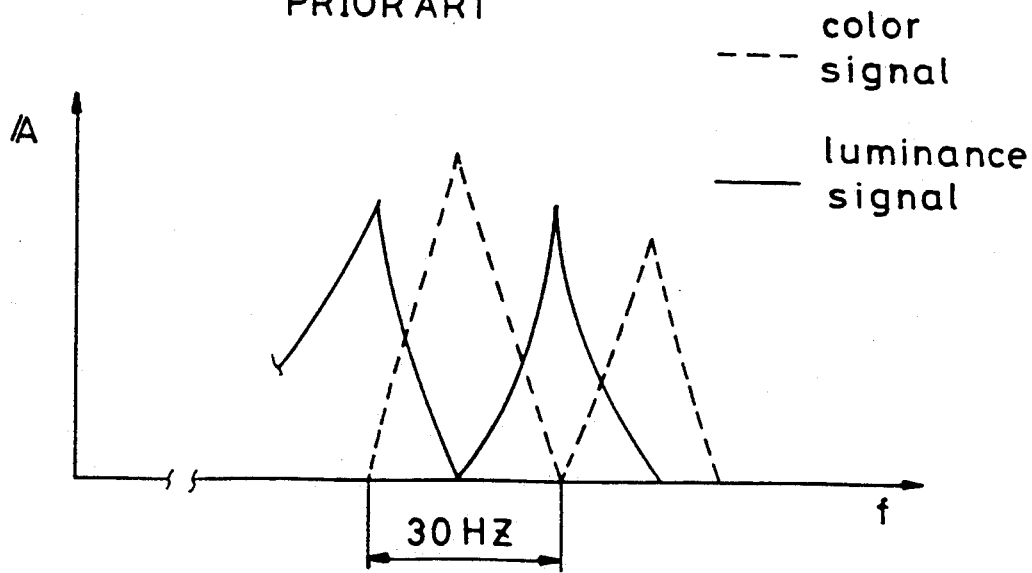
FIG. 3B illustrates a one-dimensional frequency spectrum showing an arrangement of luminance and chrominance signals every frame in a television broadcasting signal in a NTSC system.
Figure 4:
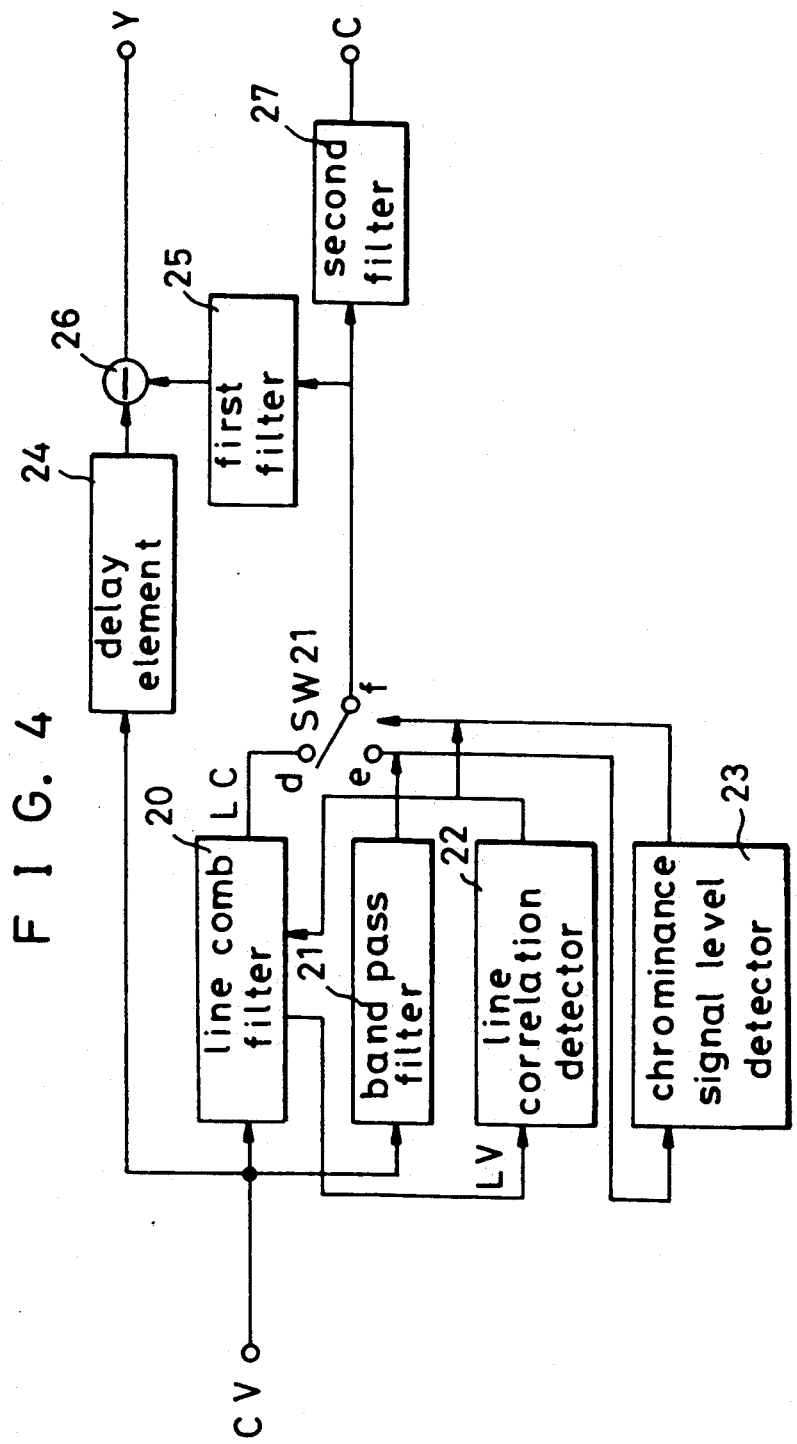
FIG. 4 is a block diagram of a system for separating luminance and chrominance signals from a composite video signal utilizing only a line comb filter in accordance with an embodiment of the present invention.

Referring to FIG. 4, there is shown a block diagram of a system for separating luminance and chrominance signals from a composite video signal utilizing only a line comb filter in accordance with an embodiment of the present invention. As shown in this figure, the system of the present invention comprises a line comb filter 20 for detecting a plurality of line difference signals LD from the composite video signal CV and selectively outputting, as a line chrominance signal LC, one of the plurality of line difference signals LD in which a line correlation is good, in response to external control signals, a band pass filter 21 for extracting a chrominance signal (center frequency fsc±0.5 MHz) from the composite video signal CV, a line correlation detector 22 for detecting the line correlations based on the plurality of line difference signals LD from the line comb filter 20 and outputting signals corresponding to the detected line correlations as the external control signals to the line comb filter 20, a chrominance signal level detector 23 for detecting a level of the chrominance signal from the band pass filter 21 and outputting a signal corresponding to the detected chrominance signal level, and a switch SW21 for inputting the line chrominance signal LC from the line comb filter 20 at its one input terminal d and the chrominance signal from the band pass filter 21 at its other input terminal e and selectively outputting one of the two input signals in response to output signals from the line correlation detector 22 and chrominance signal level detector 23 as switching control signals.

In accordance with the embodiment of the present invention, as shown in FIG. 4, the system also comprises a first filter 25 for band pass-filtering an output signal from the switch SW21 to extract a predetermined frequency band of chrominance signal, a delay element 24 for delaying the composite video signal CV by a predetermined period of time for synchronization with the chrominance signal output from the first filter 25, a subtracter 26 for subtracting the chrominance signal in the first filter 25 from the predetermined time delayed composite video signal CV in the delay element 24 and outputting the resulting luminance signal as the final luminance signal Y, and a second filter 27 for band pass-filtering the output signal from the switch SW21 and outputting the filtered signal as the final chrominance signal C.

Figure 5:
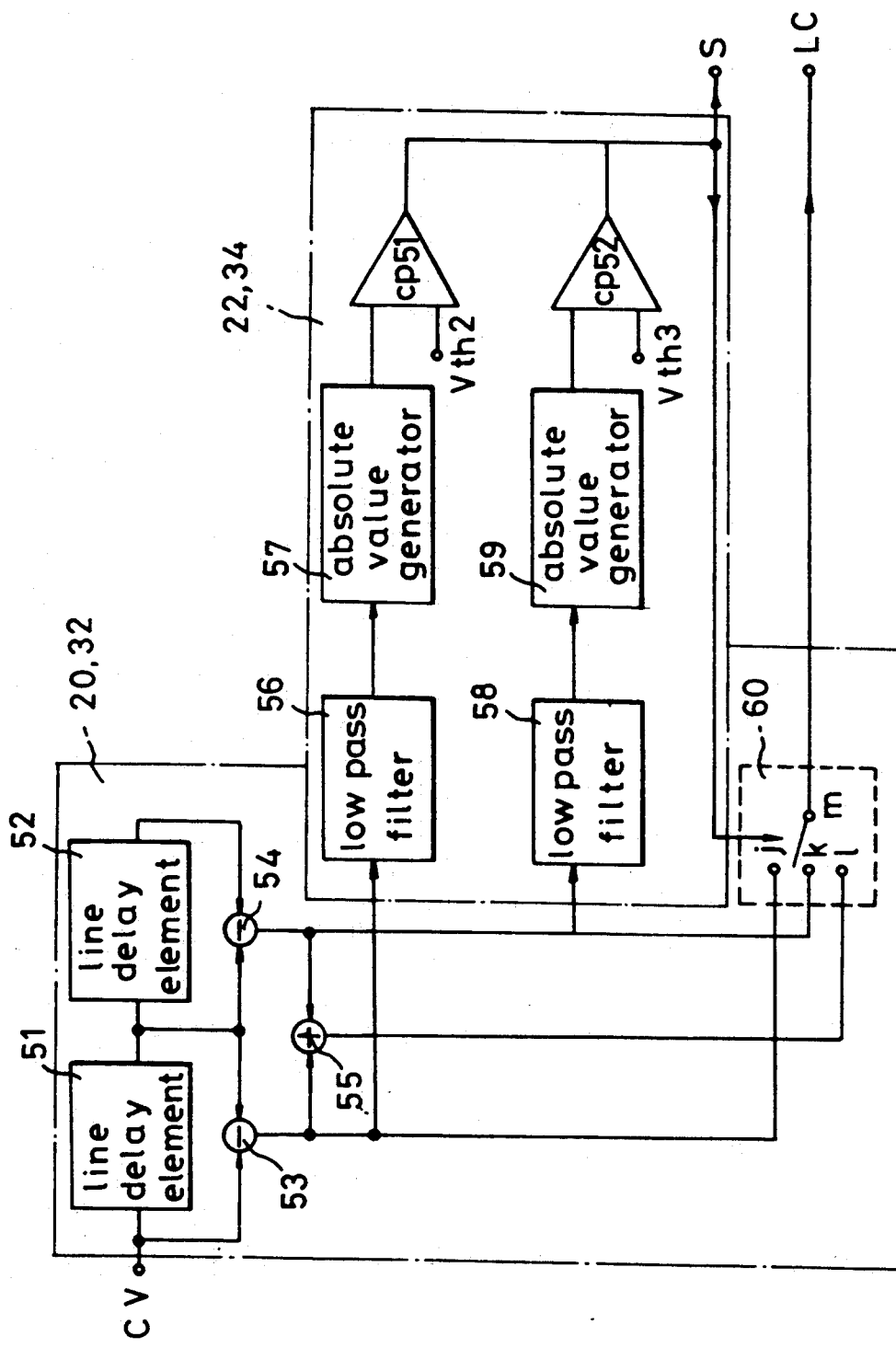
FIG. 5 is a detailed block diagram of the line comb filter and a line correlation detector in the system of FIG. 4.

Referring to FIG. 5, there is shown a detailed block diagram of the line comb filter 20 and the line correlation detector 22 in the system of FIG. 4. As shown in this drawing, the line comb filter 20 includes two line delay elements 51 and 52, two subtracters 53 and 54, an adder 55 and a multiplexer 60. In accordance with the preferred embodiment of the present invention, the line delay elements 51 and 52 may be line memories. Also, the line correlation detector 22 includes two low pass filters 56 and 58, two absolute value generators 57 and 59, and two comparators CP51 and CP52 being applied respectively with predetermined threshold values Vth2 and Vth3 at their one input terminals. Although the line comb filter is provided with the two line delay elements, the two subtracters and the one adder in the embodiment of the present invention, it may include additional subtracters, line delay elements and adders to obtain additional line difference signals. The line correlation detector also may include additional low pass filters, absolute value generators and comparators.

Figure 6:
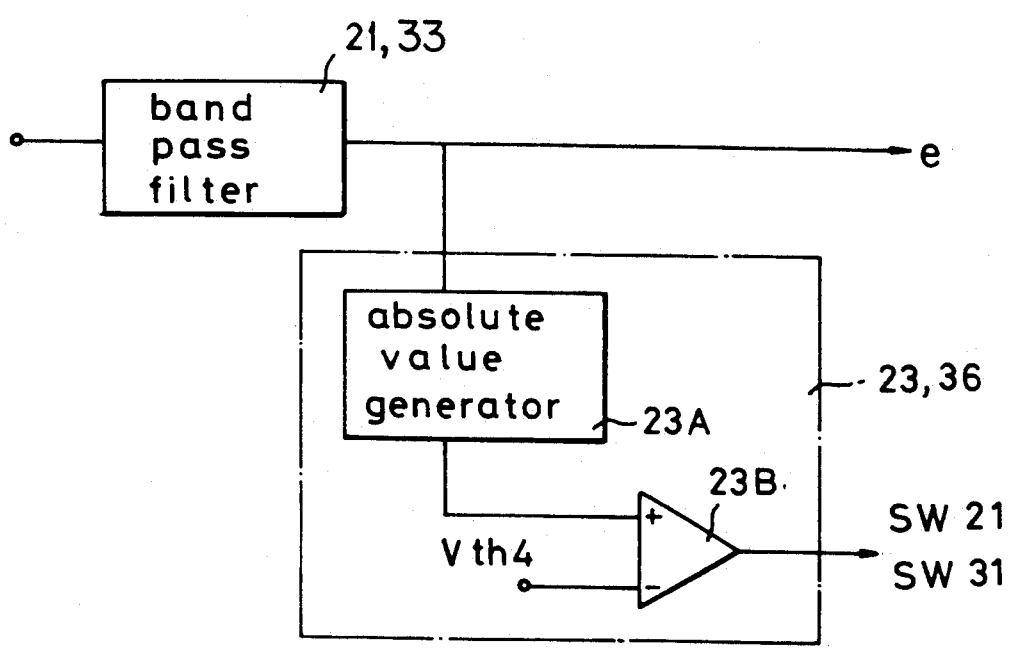
FIG. 6 is a detailed block diagram of a chrominance signal level detector in the system of FIG. 4.

Referring to FIG. 6, there is shown a detailed block diagram of the chrominance signal level detector 23 in the system of FIG. 4. As shown in the drawing, the chrominance signal level detector 23 includes an absolute value generator 23A and a comparator 23B being applied with a predetermined threshold value Vth4 at its one input terminal.

The operations of the constructions in FIGS. 5 and 6 will be described in detail later in connection with the whole operation of the system.

Figure 7:
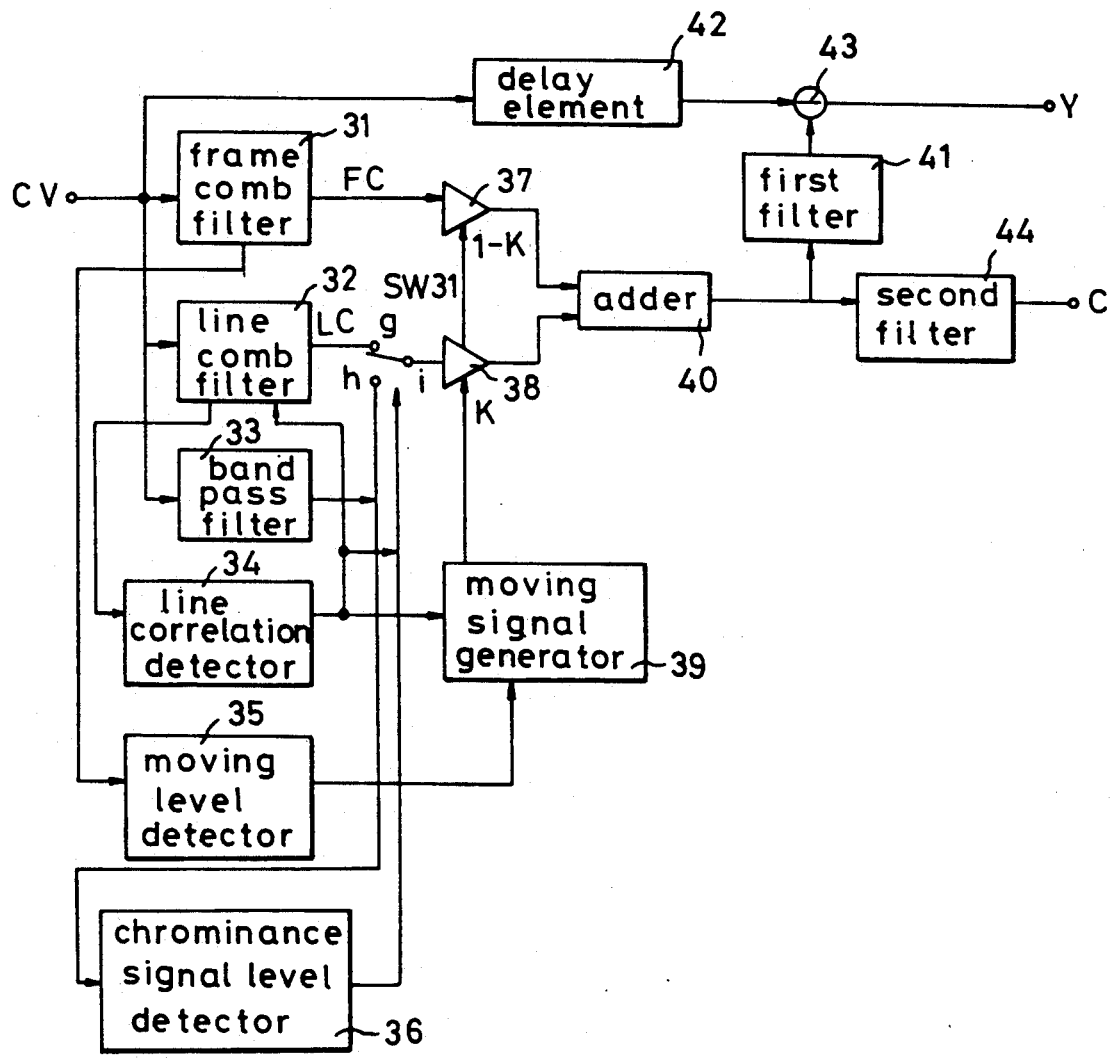
FIG. 7 is a block diagram of a system for separating luminance and chrominance signals from a composite video signal utilizing both line and frame comb filters in accordance with an alternative embodiment of the present invention.

Referring to FIG. 7, there is shown a block diagram of a system for separating luminance and chrominance signals from a composite video signal utilizing both line and frame comb filters in accordance with an alternative embodiment of the present invention. As shown in this figure, the system of the present invention comprises a frame comb filter 31 for detecting a frame difference signal FD between adjacent frames from the composite video signal CV and outputting the detected frame difference signal as a frame chrominance signal FC, a line comb filter 32 for detecting a plurality of line difference signals LD from the composite video signal CV and selectively outputting, as a line chrominance signal LC, one of the plurality of line difference signals LD in which a line correlation is good, in response to external control signals, a band pass filter 33 for extracting a predetermined frequency band of chrominance signal from the composite video signal CV, a line correlation detector 34 for detecting the line correlations based on the plurality of line difference signals LD from the line comb filter 32 and outputting signals corresponding to the detected line correlations as the external control signals to the line comb filter 32, a moving level detector 35 for detecting a moving level of the video signal based on the frame difference signal FD from the frame comb filter 31, and a chrominance signal level detector 36 for detecting a level of the chrominance signal from the band pass filter 33 and outputting a signal corresponding to the detected chrominance signal level.

In accordance with the alternative embodiment of the present invention, as shown in FIG. 7, the system also comprises a moving signal generator 39 for generating a moving factor K between 0 and 1, or $0 \leq K \leq 1$, in response to output signals from the line correlation detector 34 and moving level detector 35, a switch SW31 for inputting the line chrominance signal LC from the line comb filter 32 at its one input terminal g and the chrominance signal from the band pass filter 33 at its other input terminal h and selectively outputting one of the two input signals in response to output signals from the line correlation detector 34 and chrominance signal level detector 36 as switching control signals, an operator 38 for multiplying an output signal from the switch SW31 by the moving factor K from the moving signal generator 39, an operator 37 for multiplying the frame chrominance signal FC from the frame comb filter 31 by a value $(1-K)$ which is obtained by substracting the moving factor K from 1, an adder 40 for adding output signals from the operators 37 and 38 together, a first filter 41 for band pass-filtering an output signal from the adder 40 to extract a predetermined frequency band of chrominance signal, a second filter 44 for band pass-filtering the output signal from the adder 40 and outputting the filtered signal as the final chrominance signal C, a delay element 42 for delaying the composite video signal CV by a predetermined period of time for synchronization with the chrominance signal output from the first filter 41, a subtracter 43 for subtracting the chrominance signal in the first filter 41 from the predetermined time delayed composite video signal CV in the delay element 42 and outputting the resulting luminance signal as the final luminance signal Y.

In FIGS. 4 and 7, the band pass filter 21 or 33 and the first filter 25 or 41 for band pass-filtering may be substituted with filters for high pass-filtering in a case where the system performs a band width compression function.

Also, the constructions of the line comb filter 32, line correlation detector 34 and chrominance signal level detector 36 in the alternative embodiment of the present invention are the same as those in the first embodiment as shown in FIGS. 5 and 6 and a description thereof will thus be omitted.

Herein, the band width compression is that compresses a band width of a composite video signal of higher frequency band when it is required to be compressed into a signal of lower frequency band. For example, that makes a signal of 10 mega band width into a signal of 5 mega band width without loss is referred to as the band width compression. On the contrary, that restores the band width-compressed signal to the original band signal is referred to as a band width extension.

Figure 8:
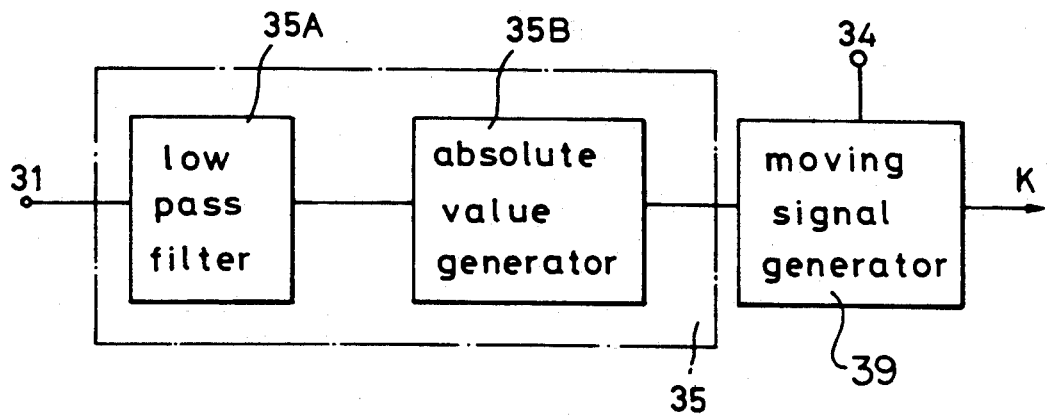
FIG. 8 is a detailed block diagram of a moving level detector and a moving signal generator in the system of FIG. 7.

Referring to FIG. 8, there is shown a detailed block diagram of the moving level detector 35 and the moving signal generator 39 in the system of FIG. 7. As shown in this drawing, the moving level detector 35 includes a low pass filter 35A and an absolute value generator 35B. Also, the moving signal generator 39 is provided with a read only memory (ROM) for storing a plurality of moving factor K values between 0 and 1 and generating a corresponding one of the stored values as the moving factor K in response to the output signals from the line correlation detector 34 and moving level detector 35.

The principles of the moving level detector 35 and the moving signal generator 39 in accordance with the present invention will now be described.

In the moving level detector 35, the low pass filter 35A removes the chrominance signal component of fsc (3.58 MHz) ±0.5 MHz from the inputted frame difference signal and the absolute value generator 35B then generates an absolute value of the residual luminance signal component from the low pass filter 35A. In the composite video signal of still picture, the luminance signal components of two successive frames (the current frame and a frame prior to one frame or a frame next to one frame) are in phase and the chrominance signal components of the two successive frames are 180° out of phase. As a result, the frame difference signal appears as only the chrominance signal component and no residual luminance signal component $\Delta Y$ is present at the output of the low pass filter 35A. For this reason, the absolute value generator 35B outputs a value approximated to zero. On the other hand, in the composite video signal of moving picture, both the luminance signal components and the chrominance signal components of the two successive frames are 180° out of phase. As a result, the frame difference signal appears as both the chrominance signal component and the luminance signal component and only the luminance signal component is present at the output of the low pass filter 35A because of removal of the chrominance signal component (fsc±0.5 MHz). For this reason, the absolute value generator 35B outputs a value greater than zero.

Then, the output signal from the absolute value generator 35B is applied to the ROM of the moving signal generator 39 simultaneously with the output signals from the line correlation detector 34. In response to the applied signals, the ROM outputs a corresponding one of the plurality of moving factor K values stored therein, as the moving factor K. Herein, the moving factor K may be any value between 0 and 1. Namely, $0 \leq K \leq 1$. In this connection, it is noted that the more the moving factor K is approximate to 1, the more the moving level of the video signal becomes severe.

The principles of the line correlation detector 34 in accordance with the present invention will now be described.

In FIG. 5, each of the plurality of line difference signals provided from the line comb filter 32 includes the residual luminance signal component $\Delta Y$ strictly as mentioned above. As a result, in the line correlation detector 34, the low pass filters 56 and 58 remove the chrominance signal components from the inputted line difference signals, respectively, and the absolute value generators 57 and 59 then generate absolute values of the residual luminance signal components $\Delta Y$ from the low pass filters 56 and 58, respectively. In result, the line correlations are determined according to largeness and/or smallness of the absolute values.

The reason why the line correlation detector 34 and the moving level detector 35 are utilized together in the alternative embodiment of the present invention is because the detected line correlations are applied to the selection of the moving factor K. In other words, the output of the line correlation detector 34 approximated to 0 indicates that the line correlation is very good, and in this case the output of the line comb filter 32 is utilized although the moving of the video signal is somewhat present.

Now, the operations of the systems with the abovementioned constructions in accordance with the first and second embodiments of the present invention will be described in detail with reference to FIGS. 9 through 14.

First in FIGS. 4 and 7, the composite video signal CV including the luminance and chrominance signals Y and C is fed to the line comb filter 20 or 32. As stated previously, the line comb filter 20 or 32 is comprised of the two line delay elements 51 and 52, the two subtracters 53 and 54, the one adder 55 and the multiplexer 60. The line delay element 51 delays the composite video signal CV by one line and the line delay element 52 delays the one line-delayed composite video signal from the line delay element 51 by one line. The substracter 53 substracts the composite video signal CV from the one line-delayed composite video signal CV from the line delay element 51 and the subtracter 54 subtracts the one line-delayed composite video signal CV from the line delay element 51 from the two line-delayed composite video signal CV from the line delay element 52. The output signals from the subtracters 53 and 54 are added together in the adder 55. Then, the output signals from the subtracters 53 and 54 and the adder 55 are applied respectively to input terminals j, k and l of the multiplexer 60.

On the other hand, the output signals from the subtracter 53 and 54 are also fed respectively to the low pass filters 56 and 58 in the line correlation detector 22 or 34, which then remove the chrominance signal components from the fed signals to extract the residual luminance signal components $\Delta Y$, respectively. Then in the line correlation detector 22 or 34, the absolute value generators 57 and 59 generate absolute values of the residual luminance signal components $\Delta Y$ from the low pass filters 56 and 58, respectively, and apply the generated absolute values respectively to one input terminals of the comparators CP51 and CP52, the other input terminals of which are applied respectively with the predetermined threshold values Vth2 and Vth3. The comparators CP51 and CP52 compare the applied absolute values with the predetermined threshold values Vth2 and Vth3 and output compare signals S in accordance with the compared results, respectively. The compare signals S from the comparators CP51 and CP52 are then applied as the switching control signals to the multiplexer 60 in the line comb filter 20 or 32 such that the multiplexer 60 selects one of the signals inputted therein in which the line correlation is good. As a result, a signal selected in the multiplexer 60 in this manner is the line chrominance signal LC being outputted from the line comb filter 20 or 32.

The output signals S from the comparators CP51 and CP52 in the line correlation detector 34 are also fed to the moving signal generator 39 in FIG. 7 so that the line correlations are reflected in the generation of the moving factor K. Also, the output signals S from the comparators CP51 and CP52 in the line correlation detector 22 or 34 are applied to the switch SW21 or SW31 in FIGS. 4 and 7 such that the switch SW21 or SW31 selects the output of the band pass filter 21 or 33 instead of the output of the line comb filter 20 or 32 when the line correlation is bad.

The operations of the band pass filters 21 or 33 and the chrominance signal level detector 23 or 36 in FIGS. 4 and 7 are as follows. As shown in FIG. 6, the band pass filter 21 or 33 extracts a chrominance subcarrier from the composite video signal CV and outputs the extracted chrominance subcarrier to the chrominance signal level detector 23 or 36. In the chrominance signal level detector 23 or 36, the absolute value generator 23A generates an absolute value of the chrominance subcarrier from the band pass filter 21 or 33 and then applies the generated absolute value to one input terminal of the comparator 23B for comparison with the predetermined threshold value Vth4 at the other input terminal of the comparator 23B. The output signal from the comparator 23B is a signal for determination of a level (magnitude) of the band pass-filtered chrominance signal.

The output signal from the comparator 23B in the chrominance signal level detector 23 or 36 as shown in FIG. 6 is applied together with the output signals from the line correlation detector 22 or 34 to the switch SW21 or SW31 such that the switch SW21 or SW31 selects the output of the band pass filter 21 or 33 instead of the output of the line comb filter 20 or 32 when the line correlation is bad or when no chrominance subcarrier is present. The signal selected in the switch SW21 or SW31 in this manner is fed to the first filter 25 or 41, which then extracts a predetermined frequency band of chrominance signal from the fed signal. The output signal from the first filter 25 or 41 is subtracted in the subtracter 26 or 43 from the composite video signal CV which is outputted from the delay element 24 or 42 synchronously with the output of the first filter 25 or 41. As a result, the output signal from the subtracter 26 or 43 is the final luminance signal Y. The signal selected in the switch SW21 or SW31 is also fed to the second filter 27 or 44, which then band pass-filters the fed signal. In result, the filtered signal from the second filter 27 or 44 is the final chrominance signal C.

On the other hand, in FIG. 7, the separated frame chrominance signal from the frame comb filter 31, the separated line chrominance signal from the line comb filter 32 and the separated chrominance signal from the band pass filter 33 are operated at an appropriate rate according to the moving level of the video signal. That is, the moving level detector 35 detects the moving level of the video signal based on the frame difference signal fed from the frame comb filter 31 and provides its output signal to the moving signal generator 39. Also, the output signals from the line correlation detector 34 are provided to the moving signal generator 39. The moving signal generator 39 generates one of the values stored therein, as the moving factor K, corresponding to the moving level of the video signal detected by the moving level detector 35 and to the line correlations detected by the line correlation detector 34. The moving factor K generated in the moving signal generator 39 is applied to the operators 37 and 38, the output signals of which are added together in the adder 40 as follows:

$$V = (1-K) \times FC + (K \times LC) \quad (1)$$

$$0 \leq K \leq 1$$

where, FC: frame chrominance signal (input to the operator 37), LC: line chrominance signal (input to the operator 38), K: moving factor and V: output of the adder 40. The signal added in the adder 40 in this manner is separated into the luminance signal Y and the chrominance signal C, respectively, through the first and second filters 41 and 44 in the same manner as that in FIG. 4.

On the other hand, there may be a necessity for band width-compressing the composite video signal CV to make the resolution high. In this case, pre-filtering must precede for removal of an interference component which may occur in the band width compression. In the preferred embodiment of the present invention, the pre-filtering for the band width compression can be performed simultaneously with the separation of the luminance and chrominance signals utilizing the video signal moving level detection and the line correlation. That is, when the band width compression is required, the pre-filtering can be established by substituting high pass filters for the band pass filter 21 or 33 and the first filter 25 or 41. As a result, the pre-filtering for the band width compression can be performed simultaneously with the separation of the luminance and chrominance signals, with no separate pre-filter.

Figure 9:
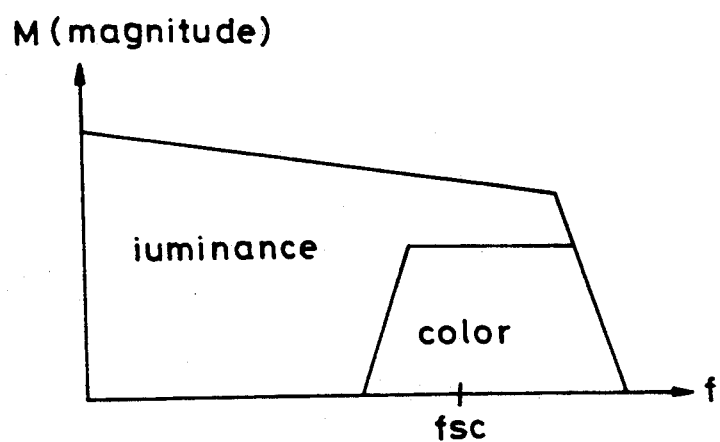
FIG. 9 illustrates a one-dimensional frequency spectrum of a composite video signal.
Figure 10A:
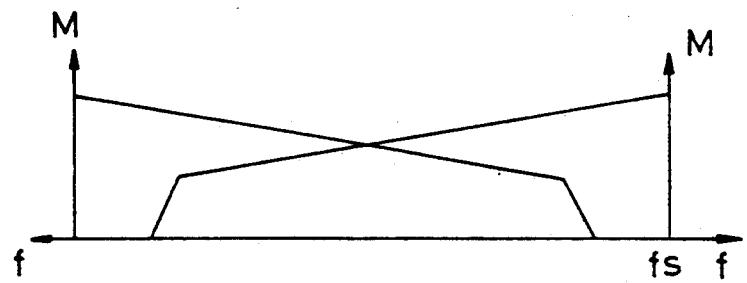
FIG. 10A illustrates a one-dimensional frequency spectrum in which the composite video signal in FIG. 9 is band width-compressed.
Figure 10B:
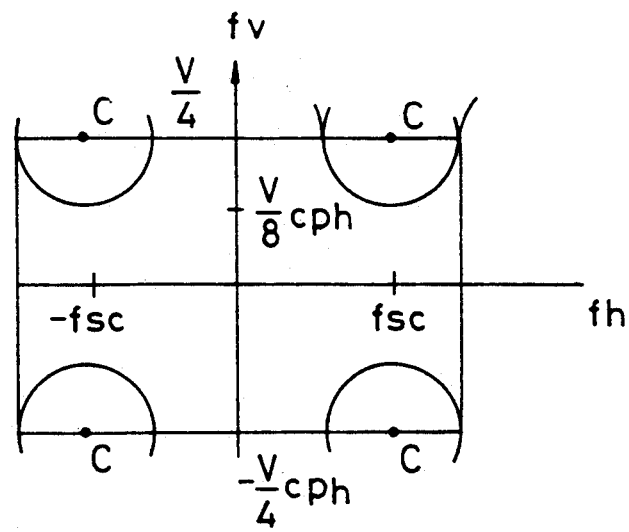
FIG. 10B illustrates a vertical-horizontal, two-dimensional frequency spectrum of the composite video signal in FIG. 9.

FIG. 9 illustrates a one-dimensional frequency spectrum of the composite video signal CV and FIG. 10A illustrates a one-dimensional frequency spectrum in which the composite video signal CV in FIG. 9 is band width-compressed. An interference component can be removed by band width-compressing the composite video signal CV in FIG. 9 as shown in FIG. 10A. In FIG. 10A, frequencies are superposed on each other by subnyquist sampling. FIG. 10B illustrates a vertical-horizontal (fv-fh), two-dimensional frequency spectrum of the composite video signal CV in FIG. 9.

Figure 11:
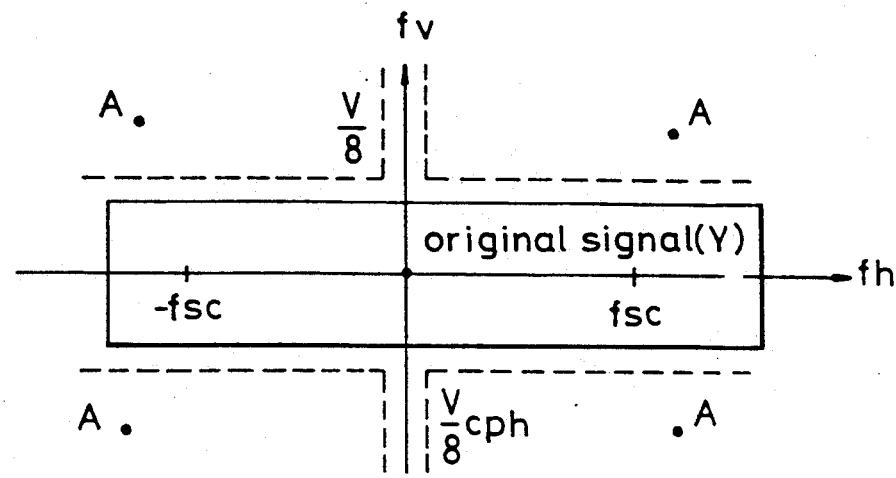
FIG. 11 illustrates a vertical-horizontal, two-dimensional frequency spectrum showing a case where only a luminance signal is band width-compressed after separation of a chrominance signal by the line comb filter in the system of FIG. 4 or 7.

FIG. 11 illustrates a vertical-horizontal (fv-fh), two-dimensional frequency spectrum showing a case where only the luminance signal is band width-compressed as shown in FIG. 10A after separation of the chrominance signal by the line comb filter 20 or 32 on the basis of the line correlation detection. In this drawing, A points other than the original signal Y represents a band width-compressed frequency spectrum. It can be seen from FIG. 11 that the band width compression can be performed without any interference component.

Figure 12:
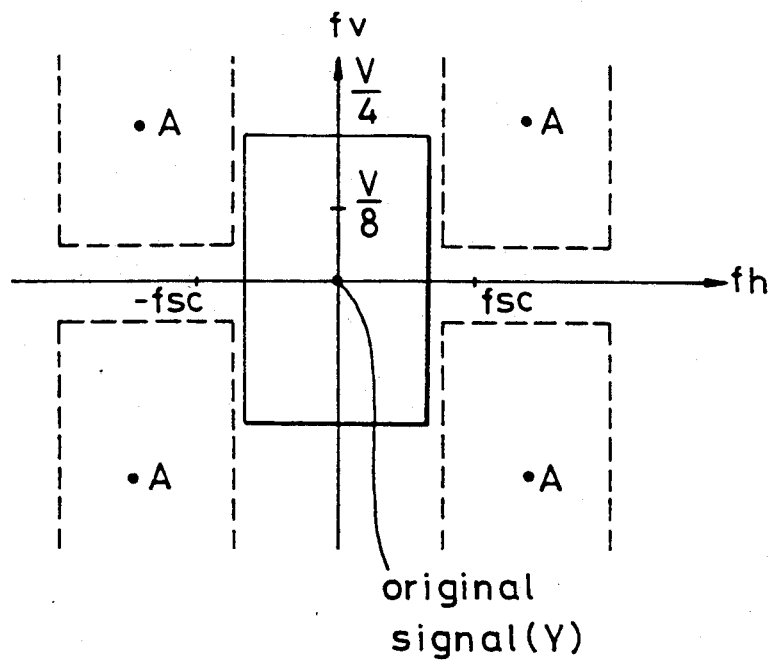
FIG. 12 illustrates a vertical-horizontal, two-dimensional frequency spectrum showing a case where only a luminance signal is band width-compressed after separation of a chrominance signal by a band pass filter in the system of FIG. 4 or 7.

FIG. 12 illustrates a vertical-horizontal (fv-fh), two-dimensional frequency spectrum showing a case where only the luminance signal is band width-compressed as shown in FIG. 10A after separation of the chrominance signal by the band pass filter 21 or 33. Similarly herein, A points other than the original signal Y represents a band width-compressed frequency spectrum.

FIG. 13 illustrates a vertical-time (fv-ft), two-dimensional frequency spectrum showing a pre-filtering effect in a case where only the luminance signal is band width-compressed after separation of the chrominance signal by the line comb filter 20 or 32 on the basis of the video signal moving level detection. Finally, FIG. 14 illustrates a vertical-time (fv-ft), two-dimensional frequency spectrum showing a pre-filtering effect in a case where only the luminance signal is band width-compressed after separation of the chrominance signal by the frame comb filter 31 on the basis of the video signal moving detection.

As mentioned above, the pre-filtering for removal of an interference component in the band width compression can be performed with no separate filter, simultaneously with the separation of the luminance and chrominance signals Y and C utilizing the line correlations of the current line signal and a signal prior or next to one line and the detection of the video signal moving level from the frame difference signal.

Although the composite video signal of the NTSC system has been employed in the preferred embodiments of the present invention, the composite video signal is not limited to the NTSC system since it is also similar to that of a PAL system.

As hereinbefore described, according to present invention, in the composite video signal of moving picture, selection of the chrominance signal in which the line correlation is good can be made according to the line correlation detection and the video signal moving detection, thereby enabling the separation of the luminance and chrominance signals of good quality from the composite video signal. Therefore, the present invention may be applied to obtain a better quality of picture in high vision systems of high resolution, such as a high definition television set (HDTV), an enhanced definition television set (EDTV) and a high definition video, cassette recorder (HDVCR). Also, the pre-filtering for removal of an interference component in the band width compression of the composite video signal can be performed with no separate filter, thereby making it simple the constructions of the television set, the VCR and the like to which the present invention may be applied. Moreover, the present invention may be applied to all recording/playback systems with the band width compression function.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A system for separating luminance and chrominance signals from a composite video signal, comprising:
   line comb filtering means for detecting a plurality of line difference signals from the composite video signal and selectively outputting, as a line chrominance signal, one of the plurality of line difference signals, in response to external control signals;
   first filtering means for extracting a predetermined frequency band of chrominance signal from the composite video signal;
   line correlation detecting means for detecting line correlations based on the plurality of line difference signals from said line comb filtering means and outputting signals corresponding to detected line correlations as the external control signals to said line comb filtering means;
   chrominance signal level detecting means for detecting a level of the chrominance signal from said first filtering means;
   switching means for inputting the line chrominance signal from said line comb filtering means and the chrominance signal from said first filtering means and selectively outputting one of the line chrominance and chrominance input signals in response to output signals from said line correlation detecting means and said chrominance signal level detecting means as switching control signals;
   second filtering means for filtering an output signal from said switching means to extract a predetermined frequency band of chrominance signal;
   third filtering means for filtering the output signal from said switching means and outputting the filtered signal as a final chrominance signal;
   delay means for delaying the composite video signal by a predetermined period of time for synchronization with the chrominance signal output from said second filtering means; and
   subtracting means for subtracting the chrominance signal in said second filtering means from the predetermined time delayed composite video signal in said delay means to obtain a resulting luminance signal and outputting the resulting luminance signal as a final luminance signal.

2. A system for separating luminance and chrominance signals from a composite video signal, as set forth in claim 1, wherein said first and second filtering means are high pass filters when said system is a band width compression system.

3. A system for separating luminance and chrominance signals from a composite video signal, as set forth in claim 1, wherein said first to third filtering means are band pass filters.

4. A system for separating luminance and chrominance signals from a composite video signal, as set forth in claim 1, wherein said line comb filtering means includes:
   a first line delay element for delaying the composite video signal by one line;
   a second line delay element for delaying an output signal from said first line delay element by one line;
   a first subtracter for subtracting the composite video signal from the output signal from said first line delay element;
   a second subtracter for subtracting the output signal from said first line delay element from an output signal from said second line delay element;
   an adder for adding output signals from said first and second subtracters together; and
   a multiplexer for inputting the output signals from said first and second subtracters and an output signal from said adder, selecting one of the signals inputted therein, in response to the external control signals from said line correlation detecting means, and outputting the selected signal as the line chrominance signal.

5. A system for separating luminance and chrominance signals from a composite video signal, as set forth in claim 4, wherein said line correlation detecting means includes:
   a first low pass filter for low pass-filtering the output signal for said first subtracter in said line comb filtering means to remove a chrominance signal component therefrom and outputting a first residual luminance signal component;
   a second low pass filter for low pass-filtering the output signal from said second subtracter in said line comb filtering means to remove a chrominance signal component therefrom and outputting a second residual luminance signal component;
   a first absolute value generator for generating an absolute value of the first residual luminance signal component from said first low pass filter;

a second absolute value generator for generating an absolute value of the second residual luminance signal component from said second low pass filter;

a first comparator for comparing an output signal from said first absolute value generator with its predetermined threshold value to obtain a resulting signal and applying the resulting signal as a first external control signal to said multiplexer in said line comb filtering means; and a second comparator for comparing an output signal from said second absolute value generator with its predetermined threshold value to obtain a resulting signal and applying the resulting signal as a second external control signal to said multiplexer in said line comb filtering means.

6. A system for separating luminance and chrominance signals from a composite video signal, as set forth in claim 4, wherein said line comb filtering means further includes additional line delay elements, subtracters and adders to perform the same function.

7. A system for separating luminance and chrominance signals from a composite video signal, as set forth in claim 5, wherein said line correlation detecting means further includes additional low pass filters, absolute value generators and comparators to perform the same function.

8. A system for separating luminance and chrominance signals from a composite video signal, as set forth in claim 4, wherein said first and second line delay elements are line memories.

9. A system for separating luminance and chrominance signals from a composite video signal, as set forth in claim 1, wherein said chrominance signal level detecting means includes:

an absolute value generator for generating an absolute value of the chrominance signal from said first filtering means; and a comparator for comparing an output signal from said absolute value generator with its predetermined threshold value to obtain a resulting signal and applying the resulting signal as a switching control signal to said switching means.

10. A system for separating luminance and chrominance signals from a composite video signal, comprising:

frame comb filtering means for detecting a frame difference signal between adjacent frames from the composite video signal and outputting the detected frame difference signal as a frame chrominance signal;

line comb filtering means for detecting a plurality of line difference signals from the composite video signal and selectively outputting, as a line chrominance signal, one of the plurality of line difference signals, in response to external control signals;

first filtering means for extracting a predetermined frequency band of chrominance signal from the composite video signal;

line correlation detecting means for detecting line correlations based on the plurality of line difference signals from said line comb filtering means and outputting signals corresponding to detected line correlations as the external control signals to said line comb filtering means;

chrominance signal level detecting means for detecting a level of the chrominance signal from said first filtering means;

switching means for inputting the line chrominance signal from said line comb filtering means and the chrominance signal from said first filtering means and selectively outputting one of the line chrominance and chrominance input signals in response to output signals from said line correlation detecting means and said chrominance signal level detecting means as switching control signals;

moving level detecting means for detecting a moving level of a video signal based on the frame difference signal from said frame comb filtering means;

moving signal generating means for generating a moving factor in response to the output signals from said line correlation detecting means and an output signal from said moving level detecting means;

first operating means for operating together an output signal from said switching means and the moving factor from said moving signal generating means;

second operating means for operating together the frame chrominance signal from said frame comb filtering means and a value which is obtained by subtracting the moving factor from a predetermined reference value;

adding means for adding output signals from said first and second operating means together;

second filtering means for filtering an output signal from said adding means to extract a predetermined frequency band of chrominance signal;

third filtering means for filtering the output signal from said adding means and outputting the filtered signal as a final chrominance signal;

delay means for delaying the composite video signal by a predetermined period of time for synchronization with the chrominance signal output from said second filtering means; and subtracting means for subtracting the chrominance signal in said second filtering means from the predetermined time delayed composite video signal in said delay means to obtain a resulting luminance signal and outputting the resulting luminance signal as a final luminance signal.

11. A system for separating luminance and chrominance signals from a composite video signal, as set forth in claim 10, wherein said first to third filtering means are band pass filters.

12. A system for separating luminance and chrominance signals from a composite video signal, as set forth in claim 10, wherein said first and second filtering means are high pass filters when said system is a band width compression system.

13. A system for separating luminance and chrominance signals from a composite video signal, as set forth in claim 10, wherein said line comb filtering means includes:

a first line delay element for delaying the composite video signal by one line;

a second line delay element for delaying an output signal from said first line delay element by one line;

a first subtracter for subtracting the composite video signal from the output signal from said first line delay element;

a second subtracter for subtracting the output signal from said first line delay element from an output signal from said second line delay element;

an adder for adding output signals from said first and second subtracters together; and a multiplexer for inputting the output signals from said first and second subtracters and an output signal from said adder, selecting one of the signals inputted therein, in response to the external control signals from said line correlation detecting means, and outputting the selected signal as the line chrominance signal.

14. A system for separating luminance and chrominance signals from a composite video signal, as set forth in claim 13, wherein said line correlation detecting means includes:
- a first low pass filter for low pass-filtering the output signal from said first subtracter in said line comb filtering means to remove a chrominance signal component therefrom and outputting a first residual luminance signal component;
- a second low pass filter for low pass-filtering the output signal from said second subtracter in said line comb filtering means to remove a chrominance signal component therefrom and outputting a second residual luminance signal component;
- a first absolute value generator for generating an absolute value of the first residual luminance signal component from said first low pass filter;
- a second absolute value generator for generating an absolute value of the second residual luminance signal component from said second low pass filter;
- a first comparator for comparing an output signal from said first absolute value generator with predetermined threshold value to obtain a resulting signal and applying the resulting signal as a first external control signal to said multiplexer in said line comb filtering means; and
- a second comparator for comparing an output signal from said second absolute value generator with its predetermined threshold value to obtain a resulting signal and applying the resulting signal as a second external control signal to said multiplexer in said line comb filtering means.

15. A system for separating luminance and chrominance signals from a composite video signal, as set forth in claim 13, wherein said line comb filtering means further includes additional line delay elements, subtracters and adders to perform the same function.

16. A system for separating luminance and chrominance signals from a composite video signal, as set forth in claim 14, wherein said line correlation detecting means further includes additional low pass filters, absolute value generators and comparators to perform the same function.

17. A system for separating luminance and chrominance signals from a composite video signal, as set forth in claim 13, wherein said first and second line delay elements are line memories.

18. A system for separating luminance and chrominance signals from a composite video signal, as set forth in claim 10, wherein said chrominance signal level detecting means includes:
- an absolute value generator for generating an absolute value of the chrominance signal from said first filtering means; and
- a comparator for comparing an output signal from said absolute value generator with its predetermined threshold value to obtain a resulting signal and applying the resulting signal as a switching control signal to said switching means.

19. A system for separating luminance and chrominance signals from a composite video signal, as set forth in claim 10, wherein said moving level detecting means includes:
- a low pass filter for low pass-filtering the frame difference signal from said frame comb filtering means to remove a chrominance signal component therefrom and outputting a residual luminance signal component; and
- an absolute value generator for generating an absolute value of the residual luminance signal component from said low pass filter.

20. A system for separating luminance and chrominance signals from a composite video signal, as set forth in claim 10, wherein said moving signal generating means includes a memory for storing a plurality of moving factor values and generating a corresponding one of the stored values as the moving factor in response to the output signals from said line correlation detecting means and said moving level detecting means.

21. A system for separating luminance and chrominance signals from a composite video signal, as set forth in claim 20, wherein said memory is a read only memory.

22. A system for separating luminance and chrominance signals from a composite video signal, as set forth in claim 10, wherein when said predetermined reference value in said second operating means is 1 and the moving factor from said moving signal generating means is as follows: $0 \leq K \leq 1$, where K: moving factor, then said first operating means multiplies the output signal from said switching means by the moving factor K and said second operating means multiplies the frame chrominance signal from said frame comb filtering means by $1-$ the moving factor K.

* * * * *